(12) United States Patent
Son et al.

(10) Patent No.: US 11,586,180 B2
(45) Date of Patent: Feb. 21, 2023

(54) ASSEMBLY INFORMATION PROVIDING SYSTEM AND MODULE ASSEMBLY

(71) Applicant: LUXROBO CO., LTD., Seoul (KR)

(72) Inventors: Seungbae Son, Seoul (KR); Huijae Park, Seoul (KR); Gibag Yi, Seoul (KR); Sanghun Oh, Seoul (KR)

(73) Assignee: LUXROBO CO., LTD., Seoul (KR)

( * ) Notice: Subject to any disclaimer, the term of this patent is extended or adjusted under 35 U.S.C. 154(b) by 567 days.

(21) Appl. No.: 16/631,675

(22) PCT Filed: Sep. 18, 2019

(86) PCT No.: PCT/KR2019/012017
§ 371 (c)(1),
(2) Date: Jan. 16, 2020

(87) PCT Pub. No.: WO2020/145477
PCT Pub. Date: Jul. 16, 2020

(65) Prior Publication Data
US 2021/0247745 A1   Aug. 12, 2021

(30) Foreign Application Priority Data

Jan. 8, 2019   (KR) .................. 10-2019-0002191

(51) Int. Cl.
*G09B 19/00*   (2006.01)
*G05B 19/418*   (2006.01)
(Continued)

(52) U.S. Cl.
CPC ... *G05B 19/41805* (2013.01); *G05B 19/4185* (2013.01); *G05B 19/41875* (2013.01);
(Continued)

(58) Field of Classification Search
CPC ..................... G09B 19/0053; G05B 19/41805
See application file for complete search history.

(56) References Cited

U.S. PATENT DOCUMENTS

9,953,546 B1 * 4/2018 Goldstein .......... G09B 19/0053
2005/0026537 A1 * 2/2005 Hsieh .................... A63H 33/08
446/330
(Continued)

*Primary Examiner* — Peter R Egloff
(74) *Attorney, Agent, or Firm* — Birch, Stewart, Kolasch & Birch, LLP (57) ABSTRACT

Disclosed are an assembly information providing system and a module assembly including a module assembly including at least one control module including a functional unit including an assembly information management unit generating assembly information; and a user terminal and an assembly information providing server connected to the module assembly through a network and an assembly information providing method including: receiving, by the user terminal or the assembly information providing server, the assembly information from the control module; and storing, by the user terminal or the assembly information providing server, the assembly information and determining whether an assembly error of the module assembly occurs based on the assembly information and transmitting assembly error information to the module assembly, and the assembly error information includes module unique information of at least one module with an error.

22 Claims, 5 Drawing Sheets

(51) Int. Cl.
  *G06Q 50/04* (2012.01)
  *G09B 23/18* (2006.01)
  *G09B 7/02* (2006.01)

(52) U.S. Cl.
  CPC ............... *G06Q 50/04* (2013.01); *G09B 7/02* (2013.01); *G09B 19/0053* (2013.01); *G09B 19/0069* (2013.01); *G09B 23/183* (2013.01); *G05B 2219/2629* (2013.01); *G05B 2219/31056* (2013.01)

(56) References Cited

U.S. PATENT DOCUMENTS

| | | | |
|---|---|---|---|
| 2016/0093232 A1* | 3/2016 | Chong | G06F 8/436 434/118 |
| 2017/0004730 A1* | 1/2017 | Kim | G09B 19/0053 |
| 2017/0344127 A1* | 11/2017 | Hu | G06V 20/46 |
| 2018/0095732 A1* | 4/2018 | Hong | G06F 8/34 |
| 2018/0342172 A1* | 11/2018 | Rabyking | G09B 1/36 |

* cited by examiner

| MODULE ID (1048-1) | STAGE (1048-2) | LOWER CONNECTION MODULE (1048-3) | CONNECTION RANKING (1048-4) | CONNECTION DIRECTION (1048-5) | MODULE CATEGORY (1048-6) |
|---|---|---|---|---|---|
| CONTROL MODULE #1 | 1 | MODULE #1 | 1 | 1 | CONTROL |
| | | CONTROL MODULE #2 | 2 | 2 | |
| | | MODULE #2 | 3 | 3 | |
| MODULE #1 | 2 | CONTROL MODULE #3 | 4 | 3 | NETWORK |
| | | MODULE #4 | 5 | 2 | |
| CONTROL MODULE #2 | 2 | MODULE #5 | 6 | 3 | CONTROL |
| MODULE #2 | 2 | MODULE #6 | 6 | 2 | INPUT |
| CONTROL MODULE #3 | 3 | none | - | - | CONTROL |
| MODULE #4 | 3 | MODULE #7 | 7 | 3 | INPUT |
| MODULE #5 | 3 | none | 8 | - | OUTPUT |
| MODULE #6 | 3 | MODULE #8 | 9 | 2 | OUTPUT |
| MODULE #7 | 4 | none | 10 | - | INPUT |
| MODULE #8 | 4 | none | 11 | - | OUTPUT |

they have been proposed...

ASSEMBLY INFORMATION PROVIDING SYSTEM AND MODULE ASSEMBLY

CROSS REFERENCE TO RELATED APPLICATIONS

This application is the National Phase of PCT International Application No. PCT/KR2019/012017, filed on Sep. 18, 2019, which claims priority under 35 U.S.C. 119(a) to Korean Patent Application No. 10-2019-0002191, filed in the Republic of Korea on Jan. 8, 2019, all of which are hereby expressly incorporated by reference into the present application.

TECHNICAL FIELD

The present invention relates to an assembly information providing system and a module assembly, and more particularly, to an assembly information providing system and a module assembly which determine whether an assembly error occurs based on assembly information of a module assembly and provide assembly error information and provide assembly assistance information so as to remove, replace, and add a module.

BACKGROUND ART

In recent years, various module based fabricating tools for education, hobby, research, production, etc., have been proposed. Modules included in the fabricating tools may perform specific functions, respectively and are provided to be connected to each other to form a module assembly. In this case, respective modules may be provided to be also electrically connected to each other to transmit/receive energy, signals, data, etc. A user can fabricate a module assembly that performs a specific purpose by assembling modules according to a provided manual or an autonomously created scheme.

As one example, Korean Patent Registration No. 1761596 discloses a module assembly fabricated by assembling various types of modules including a network module, a driving module, a sensor module, and the like. In this case, the module assembly may be utilized for various purposes such as an educational kit which allows students or users to appreciate an operational principle of an electronic device while assembling modules 10, 20, 30, and 40, a research kit used for fabricating a device for a researcher to perform a specific purpose, and a toy kit which the user is capable of assembling for a hobby.

Various persons including students, normal persons, and the like in addition to the researcher which is a software or hardware specialist use the module assemblies as mentioned above. However, except for the specialist, it may difficult for the normal persons or students to assemble the module assemblies so that respective modules operate normally and prepare and use software suitable for driving the assembled module assemblies, and as a result, there may be a restriction on dissemination of the module.

Accordingly, a system is required in which it is determined whether an assembly error occurs and assembly error information is provided so that the module assembly which is being assembled or the module assembly of which assembling is completed operates without an error even during execution and assembly assistance information is provided based on assembly information of the module assembly so as to remove, replace, and add the module, so that anyone may easily fabricate and utilize multipurpose module assemblies.

DISCLOSURE

Technical Problem

The present invention is contrived to cope with the technical problem and an object of the present invention is to provide an assembly information providing system, which may substantially supplement various problems which occur due to a limit and a disadvantage in the related art, which determines whether an assembly error occurs based on assembly information of a module assembly and provides assembly error information and provides assembly assistance information so as to remove, replace, and add a module, and a module assembly.

Technical Solution

According to an embodiment of the present invention, an assembly information providing system includes: a module assembly including at least one control module including a functional unit including an assembly information management unit generating assembly information; and a user terminal and an assembly information providing server connected to the module assembly through a network, in which the user terminal or the assembly information providing server receives the assembly information from the control module, the user terminal or the assembly information providing server stores the assembly information, and determines whether an assembly error of the module assembly occurs based on the assembly information and transmits the assembly error information to the module assembly, and the assembly error information includes module unique information of at least one module with an error.

According to an embodiment of the present invention, the assembly information includes module unique information, module category, lower connection module information, and execution category, the module category represents information to classify the modules according to an execution function of the module, the lower connection module information represents module unique information of a module to be executed next on an execution order of the module assembly, and the execution category represents information to classify the modules according to a module function on the execution order of the module assembly or a module function to determine an execution direction.

According to an embodiment of the present invention, the user terminal or the assembly information providing server stores as a database module assembly assembling information and a source code corresponding thereto, which are preconfigured in advance or already used by existing users, and the user terminal or the assembly information providing server generates a source code of the module assembly based on the assembly information and the database.

According to an embodiment of the present invention, in the generating of the source code of the module assembly, a degree at which each item of the database matches an execution order and the module category of the module assembly is generated as a score based on the assembly information, a predetermined number of high-order source codes are generated, and one source code is selected among the predetermined number of high-order source codes based on an external input, and in the generating of the degree at which each item of the database matches the execution order and the module category of the module assembly as the score, if execution orders of module assemblies of an item constituted by a predetermined module and a replaceable module of the module assembly match in the database based on the module category in terms of a case where the execution order and the module category are all the same, a similarity thereof is calculated based on the number of predetermined replaceable modules.

According to an embodiment of the present invention, the assembly information providing server or the user terminal determines whether there is the error in assembling the module assembly by checking an integrity of an execution rule of the source code.

According to an embodiment of the present invention, based on the assembly error information received from the user terminal or the assembly information providing server, an LED of at least one module with an error in the module assembly is flickered in a predetermined color.

According to an embodiment of the present invention, the assembly information providing server or the user terminal provides to the module assembly the assembly assistance information including the module information at the location to be removed, replaced, and added in the module assembly and the location by checking the integrity of the execution rule of the source code of the currently assembled module assembly.

According to an embodiment of the present invention, the module assembly flickers the LED of the module at the location to be removed, replaced, and added to a predetermined color and a predetermined direction.

According to an embodiment of the present invention, the source code is a debugging source code, the module assembly is downloaded an execution file of the debugging source code from the user terminal or the assembly information providing server, and the module assembly flickers the LED of an executed module at a predetermined speed according to the execution order.

Further, according to an embodiment of the present invention, a module assembly connected to a user terminal and an assembly information providing server through a network includes: at least one control module including a functional unit including an assembly information management unit generating assembly information, in which the control module further includes an assembly information transmitting unit transmitting the assembly information to the user terminal or the assembly information providing server, and an assembly error information receiving unit receiving from the user terminal or the assembly information providing server assembly error information acquired by determining whether an assembly error occurs based on the assembly information by the user terminal or the assembly information providing server, and the assembly error information includes module unique information of at least one module with an error.

Further, according to an embodiment of the present invention, an assembly information providing method includes: generating, by an assembly information management unit of at least one control module of a module assembly, assembly information; transmitting, by an assembly information transmitting unit of the control module, the assembly information to the user terminal or the assembly information providing server; and receiving, by the assembly error information receiving unit of the control module, assembly error information acquired by determining whether an assembly error occurs based on the assembly information by the user terminal or the assembly information providing server, from the user terminal or the assembly information providing server, and the assembly error information includes module unique information of at least one module with an error.

According to an embodiment of the present invention, the assembly information providing method further includes: storing, by the user terminal or the assembly information providing server, as a database module assembly assembling information and a source code corresponding thereto, which are preconfigured in advance or already used by existing users; and generating, by the user terminal or the assembly information providing server, a source code of the module assembly based on the assembly information and the database.

According to an embodiment of the present invention, the generating of the source code of the module assembly includes generating a degree at which each item of the database matches an execution order and module category of the module assembly as a score based on the assembly information, generating a predetermined number of high-order source codes, and selecting one source code among the predetermined number of high-order source codes based on an external input, and in the generating of the degree at which each item of the database matches the execution order and module category of the module assembly as the score, if execution orders of module assemblies of an item constituted by a predetermined module and a replaceable module of the module assembly match in the database based on the module category in terms of a case where the execution order and the module category are all the same, a similarity thereof is calculated based on the number of predetermined replaceable modules.

Further, according to an embodiment of the present invention, a computer readable recording medium having a program for performing the method recorded therein is included.

Advantageous Effects

The following effects are at least achieved by the embodiments of the present invention.

According to the present invention, an assembly information providing system may be provided, which determines whether an assembly error occurs based on assembly information of a module assembly and provides assembly error information and provides information on a module at a location to be removed, replaced, and added and a location thereof so as to remove, replace, and add module as assembly assistance information, and a module assembly.

According to the present invention, when the module assembly is utilized for educational and personal toys, etc., non-specialists which do not well know hardware or software may also assemble the module assembly and remove, replace, and add the module so that a module assembly which is being assembled or a module assembly of which assembling is completed operates without an error. Accordingly, according to the present invention, since a new module assembly without the error may be easily designed, anyone may easily utilize the module assembly.

The effects according to the present invention are not limited by the contents exemplified above, and other various effects are included in the present specification.

BEST MODE

The present invention is not limited to the following disclosed embodiments but may be implemented in various different forms. The embodiments are provided only to make description of the present invention complete and to fully announce the scope of the present invention to a person having ordinary skill in the art to which the present invention pertains with the category of the invention, and the present invention will be just defined by the appended claims.

Although the terms "first", "second", and the like are used for describing various components, these components are not confined by these terms. These terms are merely used for distinguishing one component from another component. Therefore, a first component to be mentioned below may be a second component in a technical concept of the present invention.

In this specification, a case where any one component transmits data or signals to another component means a case where the component can transmit the data or signals directly to another component or transmit the data or signals to another component over at least yet another component.

The features of various embodiments of the present invention can be partially or entirely bonded to or combined with each other and can be interlocked and operated in technically various ways so as to be fully appreciated by those skilled in the art, and the embodiments can be carried out independently of or together in association with each other.

Hereinafter, a preferred embodiment of the present invention will be described in detail with reference to the accompanying drawings. Like reference numerals in the drawings denote like elements, and the size of elements in the drawings may be exaggerated for clarity of illustration.

Figure 1:
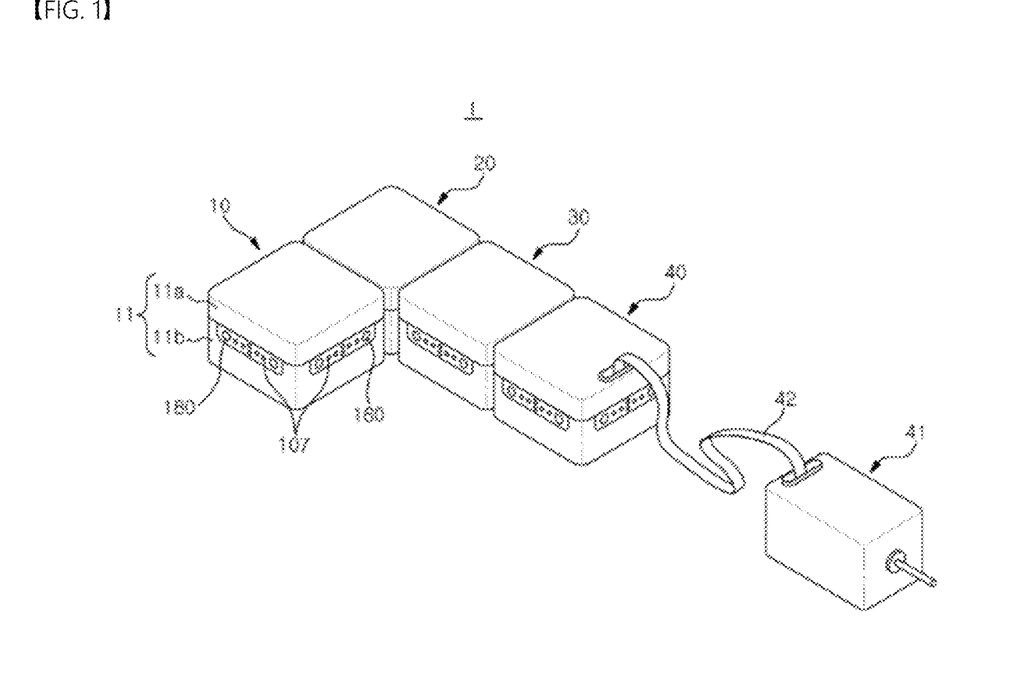
FIG. 1 is a perspective view illustrating a state where a module assembly is assembled according to an embodiment of the present invention.
Figure 2:
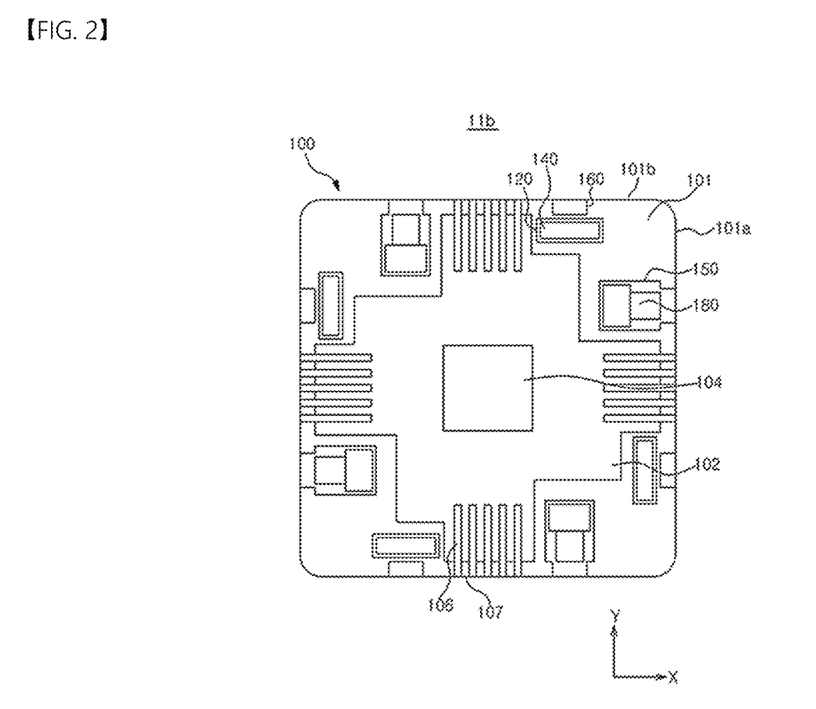
FIG. 2 is a plan view illustrating an internal structure of a module according to an embodiment of the present invention.

FIG. 1 is a perspective view illustrating a state where a module assembly is assembled according to an embodiment of the present invention and FIG. 2 is a plan view illustrating an internal structure of a module.

Referring to FIGS. 1 and 2, a module assembly 1 according to an embodiment of the present invention is constituted by a plurality of modules 10, 20, 30, and 40 which may be assembled to each other.

In the embodiment, the module assembly 1 may be defined as a set of one or more modules 10, 20, 30, and 40 which may be assembled to each other or a structure in which the modules 10, 20, 30, and 40 are assembled and is not limited by a purpose, a type, a form, the number of modules, etc. For example, the module assembly 1 may be a part of an educational kit which allows a student or a user to appreciate an operational principle of an electronic device while assembling the modules 10, 20, 30, and 40. Alternatively, the module assembly 1 may be a part of a search kit which a researcher uses for fabricating a device for performing a specific purpose. Further, the module assembly 1 may be a part of a toy kit which the user may assemble for a hobby.

For easiness of description, in the embodiment, an example in which the module assembly 1 is constituted by four modules 10, 20, 30, and 40 as illustrated in FIG. 1 is described and the module assembly 1 will be referred to as each of a first module 10, a second module 20, a third module 30, and a fourth module 40.

Moreover, in the embodiment, the modules 10, 20, 30, and 40 may be defined as objects configured to transmit and receive a signal, data, or electrical energy (hereinafter, an 'electrical signal') represented as a change in voltage or current to and from another module or an external device. The modules 10, 20, 30, and 40 include a central processing unit (CPU), a memory, a power supply, etc., or a sensing means, a processing means, a driving means, etc., which is operable by being controlled by another module to be independently driven, respectively. Further, the respective modules 10, 20, 30, and 40 may be configured to independently perform specific functions or perform specific functions by interaction with another module. When the modules 10, 20, 30, and 40 include the central processing unit, firmware may be installed for each module.

The first module 10 to the fourth module 40 may be, for example, an infrared sensor module which may receive an infrared signal from a remote controller, etc., a wireless communication module which may wirelessly communicate with a smart phone, etc., and a driving module such as a gyroscope sensor module or a motor 41. Further, the first module 10 to fourth module 40 may be connected to an external driving device 41 by a cable 42. In this case, the module assembly 1 may be a device that selectively actuates the motor 41 by receiving the signal of the remote controller or the smart phone. A configuration of the module assembly 1 is just one example and the respective modules may be provided to perform an arbitrary function independently or through interlocking with another module.

The modules 10, 20, 30, and 40 may be a cube having a polygonal pillar shape having a plurality of lateral surfaces which may be in face contact with another module. Here, it should be appreciated that face contact does not mean only that all dimensions of lateral surfaces contact each other and should be appreciated as a meaning including a case where only some of the lateral surfaces contact each other and the lateral surface of any one module and the lateral surface of another module partially contact each other while facing each other.

In the embodiment, it is illustrated as an example that all of the modules 10, 20, 30, and 40 have a plane having a square shape having the same size. That is, in the embodiment, the modules 10, 20, 30, and 40 have four lateral surfaces. Further, in the embodiment, it is described as an example that heights of the modules 10, 20, 30, and 40 are all formed to be the same as each other, and as a result, the modules 10, 20, 30, and 40 are rectangular parallelepipeds having the same size.

As another embodiment, the modules 10, 20, 30, and 40 may be formed in polygonal pillar shapes including a planar right triangular shape, a rectangular shape, a right pentagonal shape, and the like and in particular, formed in a right polygonal shape. Some modules 10, 20, 30, and 40 may have different stereoscopic shapes. Further, some of the modules 10, 20, 30, and 40 may have various stereoscopic shapes including a cone, a polyhedron, and the like.

Here, the first module 10 may include a housing 11 forming an exterior, a terminal 107 which is exposed to the lateral surface of the housing 11 to transfer or receive the electrical signal to another connected module, a pin installation portion 150 where a pin 180 which selectively protrudes to the outside of housing 11 is provided, and a pin receiving portion 160 into which a pin of another module is inserted.

The housing 11 may be, for example, a case formed in a rectangular parallelepiped shape. As illustrated in FIG. 1, the housing 11 may be provided in a form in which an upper case 11a and a lower case 11b are coupled to each other. In a method for configuring the housing 11, the upper case 11a and the lower case 11b may be integrally formed or divided into more parts and assembled as necessary.

The terminal 107 may transfer the electrical signal to another connected module or receive the electrical signal from another module and as one example, may receive the electrical signal from a substrate 102 provided in the housing 11 and transfer the electrical signal to the terminal of another module which contacts the terminal 107. The terminal 107 may have multiple contact points or connection pins and may have various shapes according to a transferring method of the electrical signal, a standardized specification, and the like. Such a terminal 107 may be disposed on one lateral surface of the housing 11 by forming one set with the pin 180, the pin installation portion 150, and the pin receiving portion 160. Specifically, the terminal 107 may be disposed between the pin 180 and the pin receiving portion 160 and may contact the terminal disposed between the pin and the pin receiving portion of another module.

In the embodiment, it is described as an example that the terminal 107 is provided on all lateral surfaces of the housing 11, but there may be a lateral surface without the terminal 107 in some embodiments.

Referring to FIG. 2, the lower case 11b may include a frame 100 forming the external and the internal structure, a substrate 102 provided inside the frame 100, and a functional unit 104 installed on the substrate 102.

The frame 100 as a structure that configures a part or the entirety of the housing 11 may form a space and a structure for forming the exterior of a part or the entirety of the housing 11 and provide a space and a structure for installing various components therein. In the embodiment, it is described as an example that the frame 100 forms the lower case 11b of the housing 11, but the scope of the present invention is not limited thereto. Further, in the embodiment, the frame 100 is formed in a rectangular shape and has four corners 101.

The functional unit 104 for implementing the function of the first module 10 may be mounted on the substrate 102 and may be fixedly installed in an inner space center of the frame 100. The functional unit 104 may include, for example, a microprocessor and in this case, when the first module 10 is driven by independent firmware, the functional unit 104 may be provided in order to control the first module 10. As another example, when the first module 10 is an infrared sensor module, the functional unit 104 may include required devices such as an infrared sensor and an analog digital converter (ADC) required for processing a value sensed by the infrared sensor and an interface required for communication with another module or external hardware, e.g., a communication interface such as I2C, UART, or USB.

The types of modules 10 to 40 of the present invention are determined according to the function of the functional unit 104. For example, the functional unit 104 may include the microprocessor and the memory and becomes a control module when the functional unit 104 includes an OS or firmware capable of controlling other units. Alternatively, the functional unit 104 becomes the sensor module when transferring the sensed value of the sensor to another module or the external device. Alternatively, the functional unit 104 may become a communication module when transmitting the electrical signal to another external device through the wired/wireless communication device by receiving the electrical signal from another module while including various wired/wireless communication devices including NB-IOT, LTE, LoRa, WiFi, Bluetooth, USB, a cable modem, etc. Alternatively, the functional unit 104 may become a driving module when being actuatable while including various actuators including the motor and the like and actuator control circuits. Other more detailed structures and combinations of the modules of the present invention are disclosed in detail in Korean Patent Registration No. 10-1761596 and included in the specification by reference.

Figure 3:
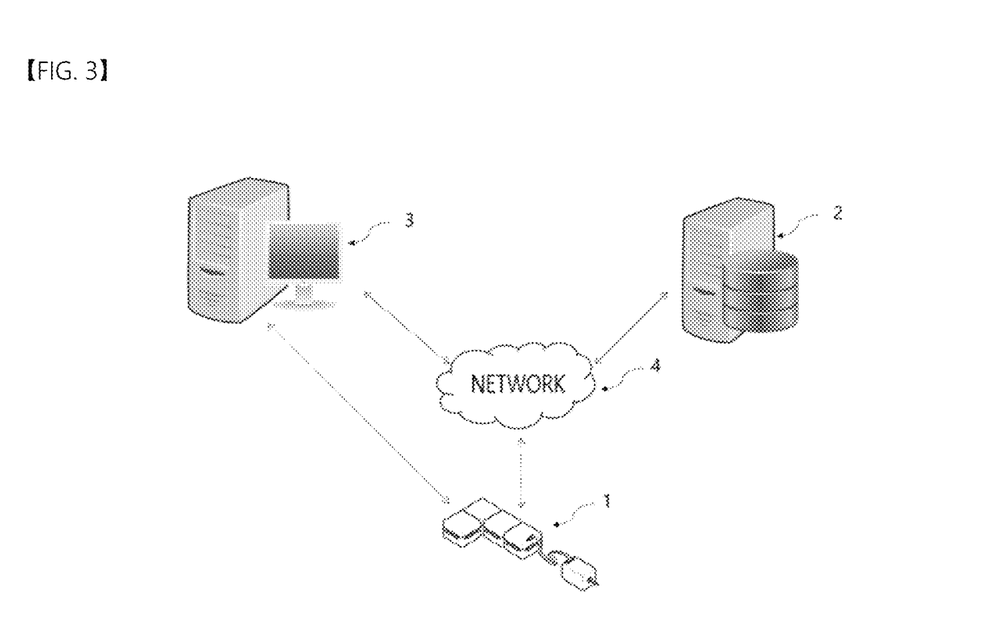
FIG. 3 schematically illustrates an assembly information providing system according to an embodiment of the present invention.

Hereinafter, with reference to FIG. 3, an assembly information providing system will be described, which assemblies the module assembly 1 having the aforementioned structure, determines whether an assembly error occurs based on assembly information of a module assembly and provides assembly error information and provides assembly assistance information so as to remove, replace, and add the module. FIG. 3 schematically illustrates an assembly information providing system according to an embodiment of the present invention. Referring to FIG. 3, the assembly information providing system according to an embodiment of the present invention may include a module assembly 1, an assembly information providing server 2, and a user terminal 3.

In this case, the module assembly 1 may be connected to the assembly information providing server 2 and the user terminal 3 through a network 4. In the embodiment, an example is described in which the network 4 is implemented by the Internet. However, the present invention is not limited thereto and those skilled in the art may implement connections with the assembly information providing server 2 and the user terminal 3 of the module assembly 1 through various networks. The network 4 includes a wired short-range communication means such as USB, RS-232, and IEEE1394, a wireless short-range communication means such as WiFi and Bluetooth, and Internet connection.

The assembly information providing server 2 or the user terminal 3 may receive assembly information from the module assembly 1 through the network and store the assembly information as a database. In this case, the assembly information providing server 2 or the user terminal 3 determine whether an assembly error occurs based on the assembly information and provides assembly error information to the module assembly 1 and provides assembly assistance information to the module assembly 1 so as to remove, replace, and add the module. The assembly information will be described below in detail with reference to FIG. 4, etc.

The assembly information providing server 2 or the user terminal 3 generates a source code based on the assembly information. The assembly information providing server 2 or the user terminal 3 stores as the database a module assembly assembling information history and a source code corresponding thereto, which are preconfigured in advance or already used by existing users and provides the source code based on the assembly information of the module assembly 1 of a current user and the database.

When the assembly information providing server 2 or the user terminal 3 provides the source code, the assembly information providing server 2 or the user terminal 3 generates as a score a degree at which each item of the database matches an execution order and module category of the module assembly 1 based on the assembly information of the module assembly 1 of the user. The assembly information providing server 2 or the user terminal 3 generates a predetermined number of high-order source codes. When the assembly information providing server 2 or the user terminal 3 generates a plurality of high-order source codes, the assembly information providing server 2 or the user terminal 3 selects the source codes preferred by the user based on an external input. It is apparent to those skilled in the art that the preferred source code may be selected by various schemes an input module of the module assembly 1 or a user interface of the user terminal 3 based on the external input.

When the assembly information providing server 2 or the user terminal 3 generates as the score the degree at which each item of the database matches the execution order and module category of the module assembly 1, if execution orders of module assemblies of an item constituted by a predetermined module and a replaceable module of the module assembly 1 match in the database based on the module category of the module assembly 1 in terms of a case where the execution order and the module category are all the same, a similarity thereof is calculated based on the number of predetermined replaceable modules. For example, the assembly information providing server 2 or the user terminal 3 assigns a full mark to items which are the same as the execution order and the module category of the module assembly 1 among the respective items of the database. Further, among the respective items of the database, there is an item constituted by modules replaceable with the predetermined module of the module assembly 1 based on the module category of the module assembly 1 and when the execution order of the item matches the execution order of the module assembly 1, a similarity score is calculated by regarding the item as a similar item. In calculating the similarity score, the similarity score may be calculated by subtracting from the score of the full mark a value acquired by multiplying the number of replaceable modules by a predetermined score, but it is apparent to those skilled in the art that the similarity score may be calculated by various equations.

The assembly information providing server 2 or the user terminal 3 determines whether there is the error in assembling the module assembly 1 by checking an integrity of an execution rule of the source code and provides the assembly error information to the module assembly 1. The assembly information providing server 2 or the user terminal 3 checks whether the module assembly 1 is arranged and assembled according to the execution rule by the integrity of the execution rule. The assembly error information includes at least one module unique information (module ID) with the error. The module assembly 1 outputs that there is the assembly error in a module with at least one error based on the assembly error information provided from the assembly information providing server 2 or the user terminal 3. It is apparent to those skilled in the art that the module assembly 1 may output that there is the assembly error by flickering an LED of the module with at least one error to a predetermined color, but output that there is the assembly error by another scheme.

Further, the assembly information providing server 2 or the user terminal 3 may recommend information on a module at a location to be removed, replaced, and added and the location based on the assembly information. As described above, the assembly information providing server 2 or the user terminal 3 provides the source code based on the assembly information of the currently assembled module assembly 1 and the database. The assembly information providing server 2 or the user terminal 3 recommends information on a module at a location to be removed, replaced, and added in the module assembly 1 and the location based on the source code. In this case, the module information at the location to be added or replaced means information on a module that may perform an additional operation as compared with a current configuration by additionally attaching the module or may be replaced in the current configuration of the module assembly 1.

The assembly information providing server 2 or the user terminal 3 according to an embodiment of the present invention provides to the module assembly 1 the assembly assistance information including the module information at the location to be removed, replaced, and added and the location by checking the integrity of the execution rule of the source code of the currently assembled module assembly 1. It is apparent to those skilled in the art that the module assembly 1 may output the module at the location to be removed, replaced, and added and the location by flickering the LED of the module at the location to be removed, replaced, and added to a predetermined color and a predetermined direction, but output the module and the location by another scheme. In this case, when the assembly information providing server 2 or the user terminal 3 provides module information at a plurality of locations to be removed, replaced, and added and the locations, the assembly information providing server 2 or the user terminal 3 may select preferred module information based on the external input.

Further, the assembly information providing server 2 or the user terminal 3 generates a debugging source code based on the assembly information. The assembly information providing server 2 or the user terminal 3 stores as the database a module assembly assembling information history and a debugging source code corresponding thereto, which are preconfigured in advance or already used by existing users and provides the debugging source code based on the assembly information of the module assembly 1 of a current user and the database. The assembly information providing server 2 or the user terminal 3 provides an execution file (hereinafter, referred to as firmware) acquired by compiling the debugging source code to the module assembly 1. Debugging firmware is downloaded to the module assembly 1. The debugging firmware flickers LEDs of executed modules at a predetermined speed according to the execution order of the module assembly 1. The debugging firmware may differently flicker an LED color to a predetermined color when waiting for the input order in the input module.

Figure 4:
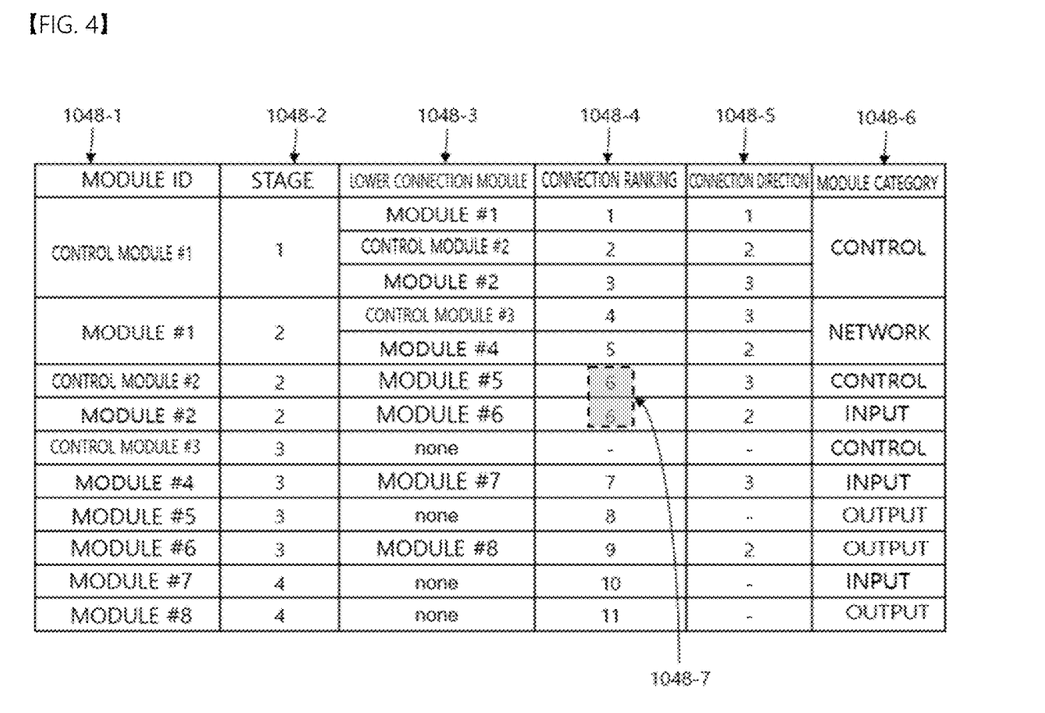
FIG. 4 illustrates assembly information according to an embodiment of the present invention.

FIG. 4 illustrates assembly information according to an embodiment of the present invention.

The assembly information includes module unique information (module ID) 1048-1, tier information 1048-2, lower connection module information 1048-3, a connection ranking 1048-4, and module category 1048-6 of the modules in the module assembly 1. The assembly information may additionally include a connection direction 1048-5.

The module unique information 1048-1 represents module IDs of modules included in the module assembly. In this case, the module unique information 1048-1 may be a module unique identifier such as a Universally Unique Identifier (QUID) and may be a temporary ID assigned during connection in a control module.

The tier information 1048-2 means a distance from the control module and is determined by counting modules connected on a shortest path from the control module 10 up to the corresponding module.

The lower connection module information 1048-3 represents module unique information of a module having a lower tier (further from the control module) than the corresponding module. By default, when each module stores information of modules connected to the corresponding module and is connected to the control module, each module may provide to the control module information of a module connected to a lower priority.

The connection ranking 1048-4 represents an order to connect to the control module. When a module group constituted by a plurality of modules which is already combined is combined to the control module 10, the same common connection ranking 1048-7 may be assigned to the module group.

The connection direction 1048-5 as additional information represents information indicating to which port the lower connection module and the higher connection module are physically connected. For example, when there are a communication module and a gyroscope sensor module, an electromagnetic wave of the communication module may influence sensing of the gyroscope sensor module, and as a result, the communication module and the gyroscope sensor module may be mutually disposed by determining the connection direction at a location where the electromagnetic wave does not influence the sensing as possible.

The module category 1048-6 represents information to classify the modules according to an execution function of the module. For example, the input module as a module that collects input electrical signals includes various sensors including a microphone, a temperature sensor, a gyroscope sensor, an infrared sensor, an ultrasonic sensor, and the like and key inputs including a dial, a button, a keyboard, and the like. The output module includes an actuator such as the motor, a light emitting diode (LED), a liquid crystal display device, and a speaker. The communication module includes network modules such as LTE, Bluetooth, etc. The control module as a module that may execute an application programmed by the user terminal 3 includes the microprocessor. When recommending the module, the assembly information providing server or the user terminal may determine whether the recommended module is a replaceable module or an addable module at the time of recommending the module based on the category information. It is apparent to those skilled in the art that the module category 1048-6 may be configured in multiple stages. For example, the module category may be configured by two stages of the input module and the microphone.

Meanwhile, the assembly information according to another embodiment of the present invention includes module unique information (module ID), module category, lower connection module information, and execution category.

The module unique information represents module IDs of modules included in the module assembly. The module category represents information to classify the modules according to the execution function of the module. For example, the input module as a module that collects input electrical signals includes various sensors including a microphone, a temperature sensor, a gyroscope sensor, an infrared sensor, an ultrasonic sensor, and the like and key inputs including a dial, a button, a keyboard, and the like. The output module includes an actuator such as the motor, a light emitting diode (LED), a liquid crystal display device, and a speaker. The communication module includes network modules such as LTE, Bluetooth, etc. The control module as a module that may execute an application programmed by the user terminal 3 includes the microprocessor. When recommending the module, the assembly information providing server or the user terminal may determine whether the recommended module is a replaceable module or an addable module at the time of recommending the module based on the category information. It is apparent to those skilled in the art that the module category may be configured in multiple stages. For example, the module category may be configured by two stages of the input module and the microphone. The lower connection module information represents module unique information of a module to be executed after its own module is executed on the order of the execution order of the module assembly. The execution category represents information to classify the modules according to a module function on the execution order of the module assembly or a module function to determine the execution direction. For example, the execution category includes a 'START' module and an 'END' module which are module functions on the execution order of the module assembly, and a 'SEQUENCE' module which is a module function to determine the execution direction. The 'SEQUENCE' module includes a 'SEQUENCE UP' module, a 'SEQUENCE DOWN' module, a 'SEQUENCE LEFT' module, and a 'SEQUENCE RIGHT' module. It may be determined whether each control module is the START module and the END module on the execution order of the module assembly through the execution category and the execution direction may be determined.

Figure 5:
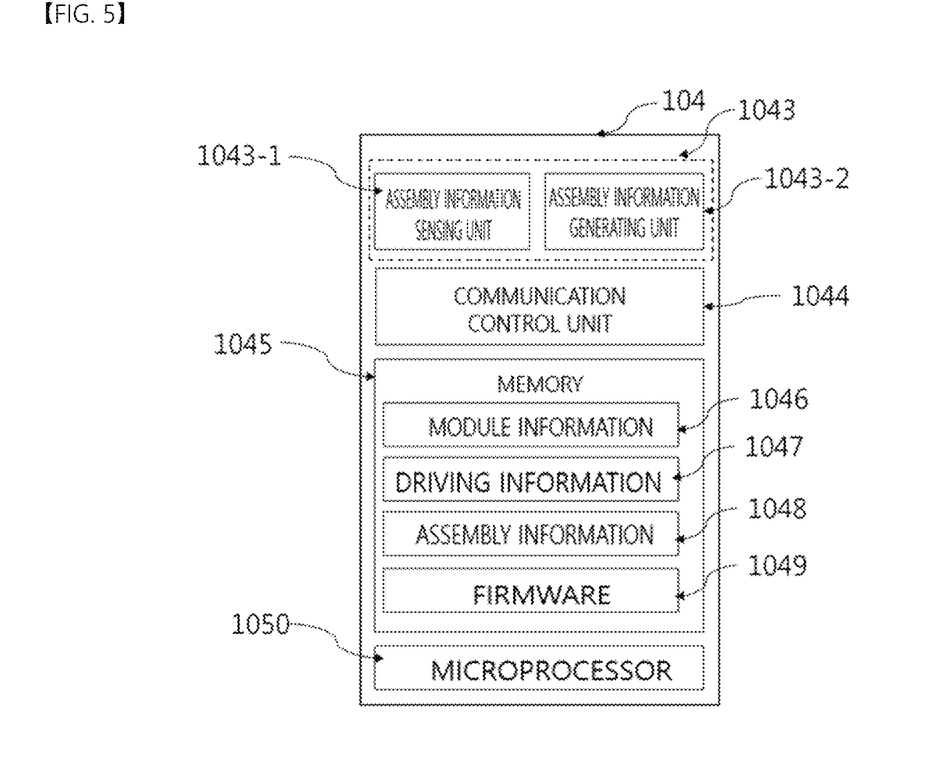
FIG. 5 is a block diagram of a control module according to an embodiment of the present invention.

In the description of the functional unit 104, the functions of the modules 10 to 40 are determined according to the configuration of the functional unit 104 as described above. FIG. 5 is a block diagram of a control module 10.

Referring to FIG. 5, the functional unit 104 of the control module 10 includes an assembly information management unit 1043, a communication control unit 1044, a memory 1045, and a microprocessor 1050.

Here, the assembly information management unit 1043 performs a function to determine the assembly information by executing a protocol for sensing a connection structure (assembly information) of the module assembly 1. More specifically, the assembly information management unit 1043 includes an assembly information sensing unit 1043-1 and an assembly information generating unit 1043-2.

The assembly information sensing unit 1043-1 is a hardware and/or software component which may include an assembly information sensing protocol and sense the assembly information of connected modules. For example, the assembly information sensing unit 1043-1 senses the module unique information, the module category, the lower connection module information, and the execution category of the modules connected to the module assembly 1.

The assembly information generating unit 1043-2 may determine the assembly information of the module assembly 1 according to the sensed assembly information and write the determined assembly information to the memory. For example, the assembly information generating unit 1043-2 generates the assembly information including the module unique information, the module category, the lower connection module information, and the execution category of the respective modules connected to the module assembly 1.

The communication control unit 1044 may control communication with an external device and communication between the modules. The communication with the external device may include various wired/wireless communication including NB-IOT, LTE, LoRa, WiFi, Bluetooth, USB, a cable modem, etc. Meanwhile, the communication between the modules may perform inter-module communication by using various internal communication means including UART, I2C, LIN, CAN, etc. The communication control unit 1044 may include various wired/wireless communication means or the communication means between the modules and perform communication by a scheme of controlling a separate network module when being connected to the separate network module.

The control module 10 may further include an assembly information transmitting unit (not illustrated) and an assembly error information receiving unit (not illustrated). The assembly information transmitting unit transmits the assembly information 1048 to the assembly information providing server 2 or the user terminal 3 through the communication control unit 1044. The assembly error information receiving unit receives, from the user terminal 3 or the assembly information providing server 2, assembly error information acquired by determining whether the assembly error occurs based on the assembly information by the user terminal 3 or the assembly information providing server 2.

The memory 1045 includes various information required for the operation of the module assembly 1, software, and various information for the assembly information of the connected module, and for example, the memory 1045 may include module information 1046, driving information 1047, assembly information 1048, and firmware 1049.

The module information 1046 includes at least one of the module ID, module category, functional information, and meta information.

The module ID may be a module unique identifier such as a Universally Unique identifier (UUID) or a temporary ID assigned during combination in the control module 10.

The module category is a concept that classifies a plurality of modules, i.e., modules having a similar function to a higher concept based on a performing function in order to assist finding replaceable modules. For example, modules for inputting the electrical signal, such as a sensor, a key, a microphone, etc., may include 'input' and an actuator, a display, an LED, etc., may include 'output' or the microprocessor and in the case of a module capable of executing a program ported by the user, a network module, a battery module, or a weight display module, 'setup', etc., may be an example of the module category.

The functional information represents a detailed function of the module and for example, the control module, the infrared sensor module, a switch module, a power supply module, and the network module may become the detailed function. In this case, the function of the module may vary depending on the configuration of the functional unit 104 in each module.

The meta information as other information of the module may become, for example, a detailed device name such as a fan and may be related keywords associated with the fan, such as 'breeze' or 'cool'.

The driving information 1047 is a driver for driving each module. The driving information may be downloaded from the assembly information providing server 2 or the user terminal 3 when the driving information is stored in the corresponding module and then provided to the control module 10 at the time of connecting the module or the control module 10 provides the module information to the assembly information providing server 2 or the user terminal 3.

The firmware 1049 as software for operating the module assembly 1 may prepare the source code through the user terminal 3 and compile the source code and then generate the compiled source code as an execution file. Alternatively, when the control module 10 provides the assembly information to the assembly information providing server 2 or the user terminal 3, the control module 10 may be recommended the source code from the assembly information providing server 2 or the user terminal 3 and be downloaded the execution file (firmware) acquired by compiling the recommended source code from the assembly information providing server 2 or the user terminal 3.

The microprocessor 1050 may be a computing device for executing the firmware and the communication control unit 1044 on the module assembly 1 and those skilled in the art may appropriately select and implement the microprocessor 1050 required for the module assembly 1.

Meanwhile, the module assembly according to another embodiment of the present invention may be constituted by a plurality of control modules. In this case, the assembly information sensed and generated by each control module includes its own module unique information (module ID), module category, lower connection module information, and execution category. Each of the plurality of modules of the module assembly generates the assembly information and provides the generated assembly information to the user terminal 3 or the assembly information providing server 2 through the communication control unit.

The assembly information providing server 2 or the user terminal 3 may receive the assembly information from the module assembly 1 through the network and store the assembly information as the database. The assembly information providing server 2 or the user terminal 3 may determine the execution order of the module assembly 1 from the START module to the END module based on the assembly information received from each control module.

The assembly information providing server 2 or the user terminal 3 generates the source code of the module assembly based on the assembly information. The assembly information providing server 2 or the user terminal 3 stores a module assembly assembling information history and a source code corresponding thereto, which are preconfigured in advance or already used by existing users and provides the source code based on the assembly information of the module assembly 1 of a current user.

The assembly information providing server 2 or the user terminal 3 determines whether there is the error in assembling the module assembly 1 by checking an integrity of an execution rule of the source code and provides the assembly error information to the module assembly 1.

Further, the assembly information providing server 2 or the user terminal 3 may recommend information on a module at a location to be removed, replaced, and added and the location based on the assembly information. The assembly information providing server 2 or the user terminal 3 stores a module assembly assembling information history and a source code corresponding thereto, which are preconfigured in advance or already used by existing users and recommends the module information at the location to be removed, replaced, and added in the module assembly 1 and the location based on the assembly information of the currently assembled module assembly 1 by referring to the stored assembly information history. The assembly information providing server 2 or the user terminal 3 according to the embodiment provides to the module assembly the assembly assistance information including the module information at the location to be removed, replaced, and added and the location by checking the integrity of the execution rule of the source code of the currently assembled module assembly 1.

Figure 6:
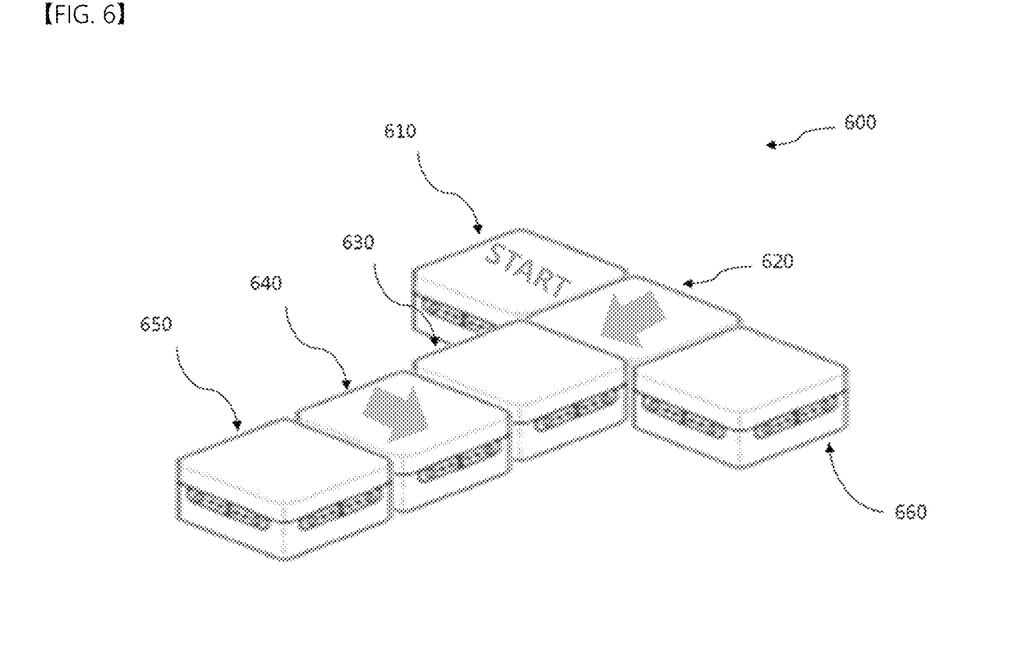
FIG. 6 illustrates a module assembly according to an embodiment of the present invention.

FIG. 6 illustrates a module assembly according to an embodiment of the present invention.

The module assembly 600 includes modules 610 to 660. The module assembly 600 includes a 'START' module 610, a 'SEQUENCE DOWN' module 620, and a 'SEQUENCE RIGHT' module 640 among execution category representing the module function on the execution order of the module assembly or the module function to determine the execution direction. The 'START' module 610 performs a start function on the execution order of the module assembly 600 and the 'SEQUENCE DOWN' module 620 changes the execution direction of the module assembly 600 to a downward direction. The 'SEQUENCE RIGHT' module 640 changes the execution direction of the module assembly 600 to a right direction. Accordingly, the module assembly 600 is executed in the order of the module 610, the module 620, the module 630, and the module 640.

In the illustrated example, a case where the 'SEQUENCE' module having the execution category for determining the execution direction, such as the 'SEQUENCE DOWN' module 620 and the 'SEQUENCE RIGHT' module 640, executes the module assembly 600 in one direction is described as an example, but the 'SEQUENCE' module may also have a priority value for each of four execution directions. In this case, when the 'SEQUENCE' module preferentially executes the module assembly in a direction in which the priority is highest and then the module assembly does not determine the execution direction any longer, the 'SEQUENCE' module may continue the execution in a direction having a next priority value.

According to an embodiment of the present invention, when one control module exists in the module assembly 600, the control module provides the assembly information to the assembly information providing server 2 or the user terminal 3.

Meanwhile, according to another embodiment of the present invention, when the module assembly 600 is constituted by a plurality of control modules, each control module provides to the assembly information providing server 2 or the user terminal 3 the assembly information including its own module unique information, the module category, the lower connection module information, and the execution category.

The assembly information providing server 2 or the user terminal 3 generates a source code based on the assembly information. The assembly information providing server 2 or the user terminal 3 stores as the database a module assembly assembling information history and a source code corresponding thereto, which are preconfigured in advance or already used by existing users and provides the source code based on the assembly information of the module assembly 600 of a current user and the database. In this case, when the assembly information providing server 2 or the user terminal 3 provides a plurality of source codes, the assembly information providing server 2 or the user terminal 3 may select the source codes preferred by the user based on an external input.

The assembly information providing server 2 or the user terminal 3 determines whether there is the error in assembling the module assembly 600 by checking an integrity of an execution rule of the source code and provides the assembly error information to the module assembly 600. The assembly error information includes at least one module unique information (module ID) with the error.

The module assembly 600 outputs that there is the assembly error in a module with at least one error based on the assembly error information provided from the assembly information providing server 2 or the user terminal 3. It is apparent to those skilled in the art that the module assembly 600 may output that there is the assembly error by flickering an LED of the module with at least one error to a predetermined color, but output that there is the assembly error by another scheme. It is apparent to those skilled in the art that the output of the assembly error is possible when the external input such as a check button is received from the user terminal 3 or the user connects a module with the error, but an output time of the assembly error may be determined by various schemes.

For example, when the module assembly 600 includes the 'START' module in the module 630, the assembly information providing server 2 or the user terminal 3 determines an error in which the 'START' module is duplicated on the execution order and provides assembly error information including the module unique information of the module 630 to the module assembly 600. The module assembly 600 flickers the LED of the module 630 to a red color based on the assembly error information to output that the assembly error occurs.

The assembly information providing server 2 or the user terminal 3 may recommend information on a module at a location to be removed, replaced, and added and the location based on the assembly information. The assembly information providing server 2 or the user terminal 3 stores as the database a module assembly assembling information history and a source code corresponding thereto, which are preconfigured in advance or already used by existing users and provides the source code based on the assembly information of the currently assembled module assembly 600 and the database. In this case, when the assembly information providing server 2 or the user terminal 3 provides a plurality of source codes, the assembly information providing server 2 or the user terminal 3 may select the preferred source codes based on an external input.

The assembly information providing server 2 or the user terminal 3 recommends information on a module at a location to be removed, replaced, and added in the module assembly 600 and the location based on the source code. The assembly information providing server 2 or the user terminal 3 provides to the module assembly 600 the assembly assistance information including the module information at the location to be removed, replaced, and added and the location by checking the integrity of the execution rule of the source code of the currently assembled module assembly 600.

For example, the assembly information providing server 2 or the user terminal 3 provides to the module assembly 600 the assembly assistance information including information of the module 640 which is a module at a location to be added on the execution order of the module assembly 600 and a location of the right direction. The module assembly 600 flickers the LED of the module 640 in the right direction based on the assembly assistance information. It is apparent to those skilled in the art that in a scheme of flickering the LED in the right direction, the LED of the module may be divided into upper, lower, left, and right zones and the 'right' zone may be flickered, but right-direction flickering may be implemented by various schemes. It is apparent to those skilled in the art that a time when the module assembly 600 outputs the module at the location to be removed, replaced, and added based on the assembly assistance information is possible when the external input such as the check button is received from the user terminal 3 or the user connects the module at the location to be removed, replaced, and added, but the time of outputting the module at the location to be removed, replaced, and added may be determined by various schemes.

Further, the assembly information providing server 2 or the user terminal 3 generates a source code for debugging based on the assembly information. The assembly information providing server 2 or the user terminal 3 stores as the database a module assembly assembling information history and a debugging source code corresponding thereto, which are preconfigured in advance or already used by existing users and provides the debugging source code based on the assembly information of the module assembly 600 of a current user and the database. The assembly information providing server 2 or the user terminal 3 provides an execution file (hereinafter, referred to as firmware) acquired by compiling the debugging source code to the module assembly 600. Debugging firmware is downloaded to the module assembly 600. The debugging firmware flickers LEDs of executed modules at a predetermined speed according to the execution order of the module assembly 600. For example, the module assembly 600 flickers the LEDs of the respective modules in the red color at a predetermined speed in the order of the module 610, the module 620, the module 630, and the module 640 according to the execution order. When the module assembly 600 waits for an input order in the input module, the LED may be flickered in a color (e.g., blue color) different from the red color.

Further, according to another embodiment of the present invention, the module assembly configures information of modules which are actually executed on the execution order of the module assembly by the assembly information and provides the information to the assembly information providing server 2 or the user terminal 3. In the case of the 'SEQUENCE' module among the execution categories of the module assembly, the user may intuitively know the execution direction of the module assembly by various methods such as display on the surface of the module, display by a module protrusion portion, and display by an LED output. Accordingly, when the 'SEQUENCE' module does not perform another function other than determination of the execution direction, the module assembly generates the assembly information based on modules which are executed on an actual execution order except for the 'SEQUENCE' module. For example, the module 610 of the module assembly 600 of FIG. 6 according to another embodiment of the present invention generates the module unique information of the module 630 as the lower connection module information thereof. Accordingly, the module assembly 600 according to another embodiment of the present invention is executed in the order of the module 610 and the module 630.

When one control module exists in the module assembly, the control module provides the assembly information to the assembly information providing server 2 or the user terminal 3.

Figure 7:
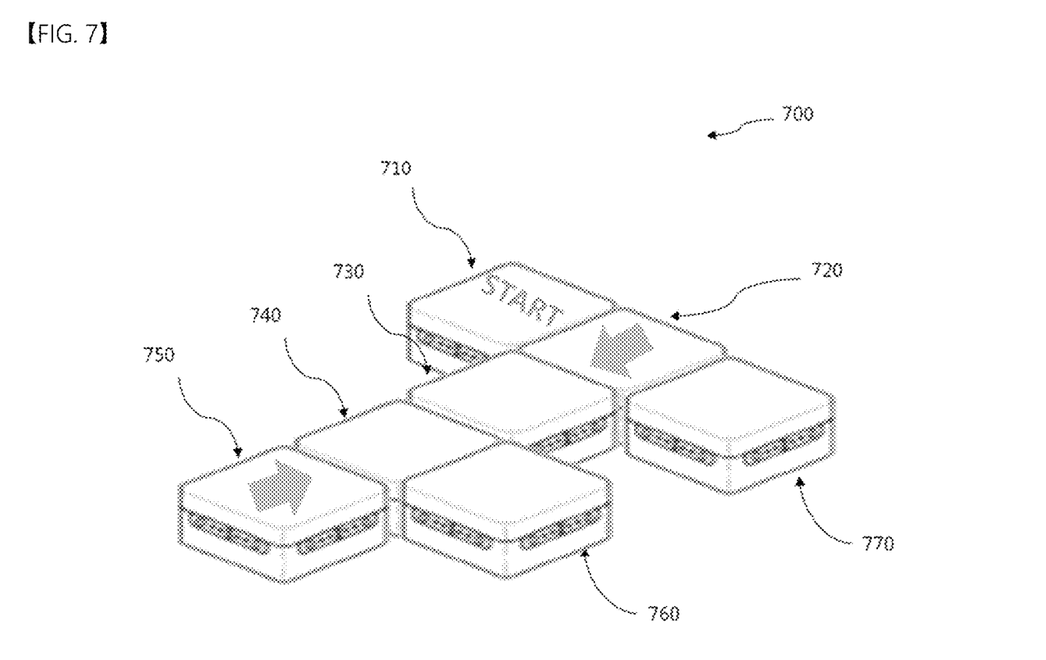
FIG. 7 illustrates a module assembly according to an embodiment of the present invention.

FIG. 7 illustrates a module assembly according to an embodiment of the present invention.

The module assembly 700 includes modules 710 to 770. The module assembly 700 includes a 'START' module 710, a 'SEQUENCE DOWN' module 720, a condition module 740, and a 'SEQUENCE UP' module 750 among the execution categories indicating the module function on the execution order of the module assembly or the module function for determining the execution direction. The 'START' module 710 performs a start function on the execution order of the module assembly 700 and the 'SEQUENCE DOWN' module 720 changes the execution direction of the module assembly 700 to a downward direction. The 'SEQUENCE UP' module 750 changes the execution direction of the module assembly 700 to an upward direction. Accordingly, the module assembly 700 is executed in the order of the module 710, the module 720, the module 730, the module 740, the module 750, the module 740, the module 730, and the module 720. In this case, the module assembly 700 repeatedly executes intervals of modules 720 to 750. The module assembly 700 includes the condition module 740 and the condition module executes a condition statement that terminates repeated execution of the intervals of the modules 720 to 750. The condition statement includes at least one of a relational operator of returning true or false according to a result by comparing two values and a logical operator of returning true or false again by computing true and false. When the condition statement of the condition module 740 is satisfied, the module assembly 700 terminates the repeated execution of the intervals of the modules 720 to 750 and executes the module 760.

According to an embodiment of the present invention, when one control module exists in the module assembly 700, the control module provides the assembly information to the assembly information providing server 2 or the user terminal 3.

Meanwhile, according to another embodiment of the present invention, when the module assembly 700 is constituted by a plurality of control modules, each control module provides to the assembly information providing server 2 or the user terminal 3 the assembly information including its own module unique information, the execution category, and the lower connection module information.

The assembly information providing server 2 or the user terminal 3 generates a source code based on the assembly information. The assembly information providing server 2 or the user terminal 3 stores as the database a module assembly assembling information history and a source code corresponding thereto, which are preconfigured in advance or already used by existing users and provides the source code based on the assembly information of the module assembly 700 of a current user and the database. In this case, when the assembly information providing server 2 or the user terminal 3 provides a plurality of source codes, the assembly information providing server 2 or the user terminal 3 may select the preferred source codes based on an external input.

The assembly information providing server 2 or the user terminal 3 determines whether there is the error in assembling the module assembly 700 by checking an integrity of an execution rule of the source code and provides the assembly error information to the module assembly 700. The assembly error information includes at least one module unique information (module ID) with the error.

For example, when the condition statement of the condition module 740 of the module assembly 700 is not satisfied, the assembly information providing server 2 or the user terminal 3 determines an error in which the repeated execution of the intervals of the modules 720 to 750 is not terminated and provides to the module assembly 700 the assembly error information including the module unique information of the module 740.

The module assembly 700 outputs that there is the assembly error in a module with at least one error based on the assembly error information provided from the assembly information providing server 2 or the user terminal 3. It is apparent to those skilled in the art that the module assembly 700 may output that there is the assembly error by flickering an LED of the module with at least one error to a predetermined color, but output that there is the assembly error by another scheme. It is apparent to those skilled in the art that the output of the assembly error is possible when the external input such as a check button is received from the user terminal 3 or the user connects a module with the error, but an output time of the assembly error may be determined by various schemes.

For example, the module assembly 700 flickers the LED of the module 740 to a red color based on the assembly error information to output that the assembly error occurs.

Combinations of each block of the accompanying block diagram and each step of the flowchart are constituted by firmware, software, or hardware. The combinations may be performed by an algorithm or computer program instructions. Since the algorithm or computer program instructions may be mounted on a universal computer, a special computer or a processor of other programmable digital signal processing device, the instructions performed by the computer or a processor of other programmable data processing equipment generate a means of performing functions described in each block of the block diagram or each step of the flowchart.

Since the algorithm or computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in each block of the block diagram or each step in the flowchart. Since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in each block of the block diagram or each step in the flowchart.

Further, each block or each step may represent a part of a module, a segment, or a code that includes one or more executable instructions for executing a specified logical function(s). It should also be noted that in some alternative embodiments, the functions mentioned in the blocks or steps may occur out of order. For example, two successive blocks or steps illustrated may in fact be performed substantially concurrently or the blocks or steps may be sometimes performed in a reverse order according to the corresponding function.

Although the present invention have been described in detail with reference to the embodiments, the present invention is not limited thereto and may be modified and implemented in many different forms without departing from the technical concept of the present invention. Therefore, the embodiments of the present invention are provided for illustrative purposes only but not intended to limit the technical concept of the present invention. The scope of the technical concept of the present invention is not limited to the embodiment. The protective scope of the present invention should be construed based on the following claims, and all the technical concepts in the equivalent scope thereof should be construed as falling within the scope of the present invention.

A device according to an exemplary embodiment of the present invention may include a bus coupled to each unit of the device illustrated in the figure and at least one processor coupled to the bus and may include a memory coupled to the bus for storing a command, a received message, or a generated message and coupled to at least one processor for performing the commands described above.

Further, the system according to the present invention may be implemented as a computer readable code in a computer readable recording medium. The computer readable recording medium includes all kinds of recording devices storing data which may be deciphered by a computer system. The computer readable recording medium includes magnetic storage media (e.g., a ROM, a floppy disk, a hard disk, and the like) and optical reading media (e.g., a CD-ROM, a DVD, and the like). Further, the computer readable recording media may store and execute codes which may be distributed in the computer system connected through a network and read by a computer in a distribution method.

The invention claimed is:

1. An assembly information providing system comprising:
a module assembly including a plurality of control modules physically connected to each other via pin connection, each control module including a functional unit including an assembly information management unit generating assembly information,
wherein the assembly information includes module unique information, a module category, lower connection module information, and an execution category; and
a user terminal and an assembly information providing server connected to the module assembly through a network,
wherein the user terminal or the assembly information providing server receives the assembly information from the control module,
the user terminal or the assembly information providing server stores the assembly information, and determines whether an assembly error of the module assembly occurs based on the assembly information and transmits the assembly error information to the module assembly, and
the assembly error information includes the module unique information of at least one of the plurality of control modules with an error, and
wherein the user terminal or the assembly information providing server notifies to a user that the at least one control module with the error is to be replaced or moved based on the assembly error information.

2. The assembly information providing system of claim 1, wherein the module category represents information to classify the plurality of control modules according to an execution function,
wherein the lower connection module information represents module unique information of a module to be executed next on an execution order of the module assembly, and
wherein the execution category represents information to classify the plurality of control modules according to a module function on the execution order of the module assembly.

3. The assembly information providing system of claim 1, wherein the user terminal or the assembly information providing server stores assembling information and a source code corresponding thereto, which are preconfigured in advance or already used by existing users, and
wherein the user terminal or the assembly information providing server generates a source code of the module assembly based on the assembly information and the database.

4. The assembly information providing system of claim 3, wherein the generating of the source code of the module assembly includes:
generating a degree at which each item of the assembly information matches an execution order and module category of the module assembly,
generating a predetermined number of high-order source codes, and
selecting one source code among the predetermined number of high-order source codes based on an external input.

5. The assembly information providing system of claim 3, wherein the assembly information providing server or the user terminal determines whether there is the error in assembling the module assembly by checking an integrity of an execution rule of the source code.

6. The assembly information providing system of claim 1, wherein the notification to the user includes flickering an LED of the at least one control module with the error in a predetermined color.

7. The assembly information providing system of claim 3, wherein the assembly information providing server or the user terminal provides to the module assembly the assembly information including a lower connection module information and the location of the at least one control module with the error to be replaced or moved by checking an integrity of an execution rule of the source code of the currently assembled module assembly.

8. The assembly information providing system of claim 7, wherein the notification to the user includes flickering an LED in a predetermined color of the at least one control module with the error and a predetermined direction.

9. The assembly information providing system of claim 8, wherein the source code is a debugging source code,
wherein an execution file of the debugging source code is downloaded from the user terminal or the assembly information providing server, and
wherein the module assembly flickers the LED of an executed control module at a predetermined speed according to the execution order.

10. A module assembly connected to a user terminal and an assembly information providing server through a network, the module assembly comprising:
a plurality of control modules physically connected to each other via pin connection, each control module including a functional unit including an assembly information management unit generating assembly information,
wherein the assembly information includes module unique information, a module category, lower connection module information, and an execution category,
wherein the control module further includes an assembly information transmitting unit transmitting the assembly information to the user terminal or the assembly information providing server, and an assembly error information receiving unit receiving from the user terminal or the assembly information providing server assembly error information acquired by determining whether an assembly error occurs based on the assembly information by the user terminal or the assembly information providing server, and
the assembly error information includes the module unique information of at least one of the plurality of control modules with an error, and
wherein the user terminal or the assembly information providing server notifies to a user that the at least one control module with the error is to be replaced or moved based on the assembly error information.

11. The module assembly of claim 10,
wherein the module category represents information to classify the plurality of control modules according to an execution function,
wherein the lower connection module information represents module unique information of a module to be executed next on an execution order of the module assembly, and
wherein the execution category represents information to classify the plurality of control modules according to a module function on the execution order of the module assembly.

12. The module assembly of claim 10, wherein the user terminal or the assembly information providing server stores assembling information and a source code corresponding thereto, which are preconfigured in advance or already used by existing users, and
the user terminal or the assembly information providing server generates a source code of the module assembly based on the assembly information and the database.

13. The module assembly of claim 12, wherein the generating of the source code of the module assembly includes:
generating a degree at which each item of the assembly information matches an execution order and module category of the module assembly,
generating a predetermined number of high-order source codes are generated, and
selecting one source code among the predetermined number of high-order source codes based on an external input.

14. The module assembly of claim 12, wherein the assembly information providing server or the user terminal determines whether there is the error in assembling the module assembly by checking an integrity of an execution rule of the source code.

15. The module assembly of claim 10, wherein the notification to the user includes flickering an LED of the at least one control module with the error in a predetermined color.

16. The module assembly of claim 12, wherein the assembly information providing server or the user terminal provides to the user terminal or the module assembly the assembly information including a lower connection module information and the location of the at least one control module with the error to be replaced or moved by checking an integrity of an execution rule of the source code.

17. The module assembly of claim 16, wherein the notification to the user includes flickering an LED of the at least one control module with the error in a predetermined color and a predetermined direction.

18. The module assembly of claim 12, wherein the source code is a debugging source code,
an execution file of the debugging source code is downloaded from the user terminal or the assembly information providing server, and
the module assembly flickers the LED of an executed control module at a predetermined speed according to the execution order.

19. An assembly information providing method comprising:
generating, by an assembly information management unit of a plurality of control modules of a module assembly, assembly information, wherein the plurality of control modules physically connected to each other via pin connection, wherein the assembly information includes module unique information, a module category, lower connection module information, and an execution category;

transmitting, by an assembly information transmitting unit of each of the plurality of control modules, the assembly information to the user terminal or the assembly information providing server; and receiving, by the assembly error information receiving unit of each of the plurality of control modules, assembly error information acquired by determining whether an assembly error occurs based on the assembly information by the user terminal or the assembly information providing server, from the user terminal or the assembly information providing server, wherein the assembly error information includes the module unique information of at least one of the plurality of control modules with an error, and wherein the user terminal or the assembly information providing server notifies to a user that the at least one control module with the error is to be replaced or moved based on the assembly error information.

20. The assembly information providing method of claim 19, further comprising:

storing, by the user terminal or the assembly information providing server, a module assembly assembling information and a source code corresponding thereto, which are preconfigured in advance or already used by existing users; and generating, by the user terminal or the assembly information providing server, a source code of the module assembly based on the assembly information and the database.

21. The assembly information providing method of claim 20, wherein the generating of the source code of the module assembly includes:

generating a degree at which each item of the assembly information matches an execution order and module category of the module assembly as a score based on the assembly information, generating a predetermined number of high-order source codes, and selecting one source code among the predetermined number of high-order source codes based on an external input.

22. A computer readable recording medium having a program for performing the method of claim 19 recorded therein.

\* \* \* \* \*